Figure 1:
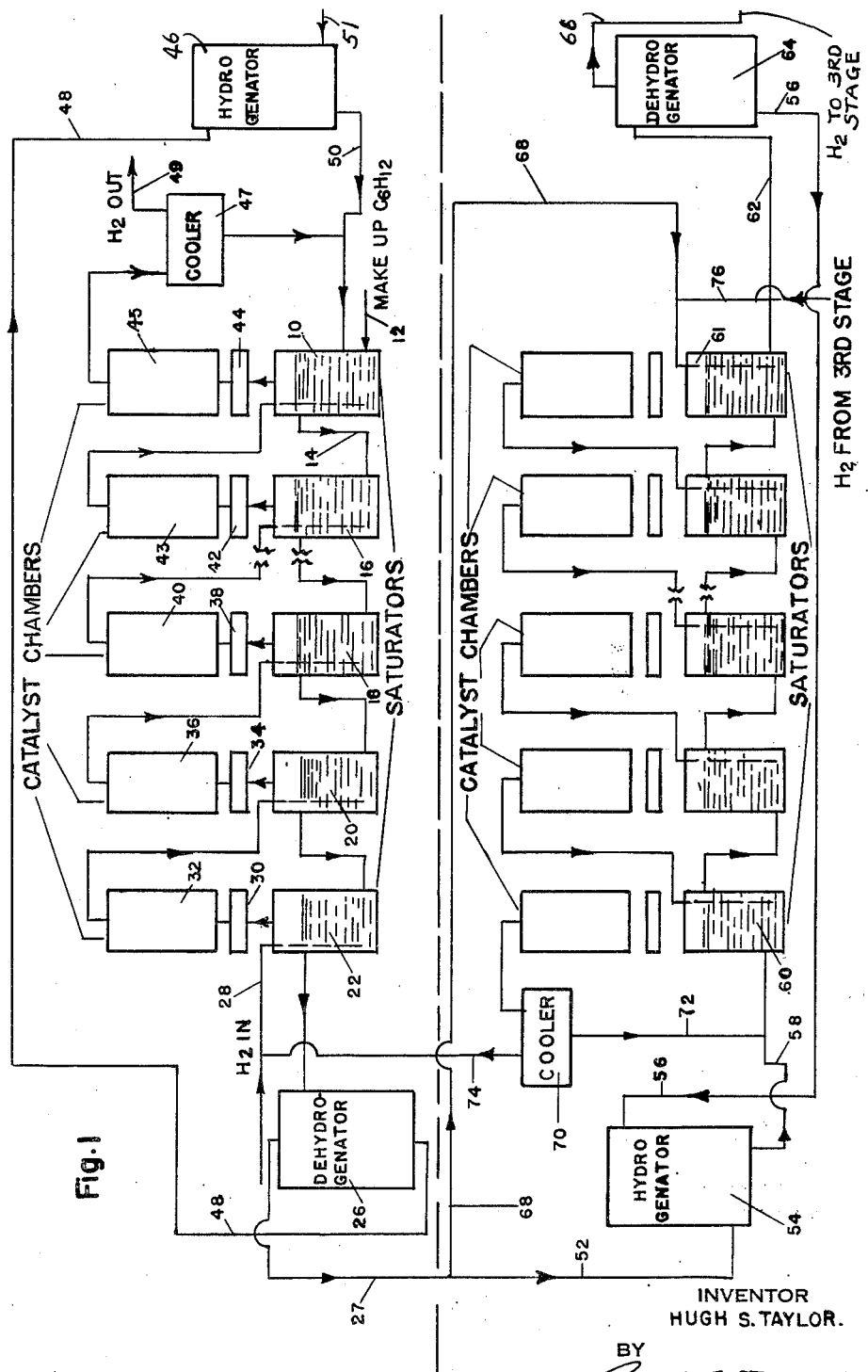

Sept. 28, 1954      H. S. TAYLOR      2,690,381
ISOTOPE EXCHANGE PROCESS FOR CONCENTRATING DEUTERIUM
Filed May 15, 1945      2 Sheets-Sheet 1

INVENTOR
HUGH S. TAYLOR.
BY
ATTORNEY

Sept. 28, 1954 H. S. TAYLOR 2,690,381
ISOTOPE EXCHANGE PROCESS FOR CONCENTRATING DEUTERIUM
Filed May 15, 1945 2 Sheets-Sheet 2

INVENTOR
HUGH S. TAYLOR
BY
*Robert A. Lavender*
ATTORNEY

Patented Sept. 28, 1954

2,690,381

UNITED STATES PATENT OFFICE 2,690,381

ISOTOPE EXCHANGE PROCESS FOR CONCENTRATING DEUTERIUM

Hugh S. Taylor, Princeton, N. J., assignor to the United States of America as represented by the United States Atomic Energy Commission Application May 15, 1945, Serial No. 593,929

22 Claims. (Cl. 23—210)

This invention relates to isotope concentration and more particularly to a method of concentrating deuterium in cyclohexane and hydrogen by utilization of an isotope exchange reaction between cyclohexane and hydrogen containing deuterium. The present application is a continuation-in-part of my co-pending application Serial No. 534,169, filed on May 4, 1944.

In my co-pending application there is disclosed a method of concentrating a desired isotope of an element in a liquid or gas by exchange of isotopes between the vapor of the liquid and a gas wherein both the liquid and gas contain the element and both are capable of containing the desired isotope of the element, the method being characterized by the steps of forming a mixture of the gas and the vapor of the liquid, passing the vapor-gas mixture at a relatively low temperature over a catalyst to cause an exchange of isotopes to take place and thereafter separating the vapor and gas to recover a product, either the gas or the vapor, which is enriched with respect to the desired isotopic species. In accordance with a preferred embodiment of this method it is disclosed that the concentration of deuterium in water containing the natural abundance of deuterium can be effectively increased by establishing a countercurrent flow of water and hydrogen gas in such manner that the hydrogen gas containing water vapor is passed alternately through bodies of liquid water having successively decreasing concentrations of deuterium and over catalyst masses to bring about an exchange of isotopes between the hydrogen gas and water vapor with the result that the hydrogen gas is successively depleted with respect to deuterium and the liquid water is successively enriched with respect to deuterium. Enriched hydrogen to be fed to the countercurrent system is obtained by electrolyzing enriched water from the countercurrent system.

In my co-pending application it is further disclosed that the method of isotope concentration described therein may also be carried out by utilizing an exchange reaction between cyclohexane and hydrogen or other hydrogen-containing gas. Claims directed to the utilization of the exchange reaction between cyclohexane and hydrogen for the concentration of deuterium are included in the present application.

It is accordingly an object of the present invention to provide a process for increasing the concentration of deuterium by utilizing an exchange reaction between cyclohexane and a gas containing hydrogen.

It is another object of the invention to provide an improved method of concentrating deuterium in cyclohexane by a vapor phase exchange reaction between cyclohexane and hydrogen.

It is still another object of the invention to provide such a method wherein temperature and pressure conditions are maintained at values that permit cyclohexane to exist as a liquid.

Other objects of the invention will be in part obvious and in part pointed out hereinafter.

In one of its broader aspects the method of the invention comprises the steps of forming a mixture of cyclohexane and hydrogen containing deuterium, causing an exchange of hydrogen isotopes between the hydrogen and cyclohexane to produce cyclohexane enriched with respect to deuterium and hydrogen depleted with respect to deuterium, and dehydrogenating at least a part of the enriched cyclohexane to obtain hydrogen enriched in deuterium. As conducive to a clearer understanding of the invention it may be pointed out that when cyclohexane and hydrogen are mixed in the presence of a suitable catalyst a hydrogen isotope exchange reaction tends to occur in accordance with the following equation.

$$C_6H_{12} + HD \rightleftharpoons C_6H_{11}D + H_2$$

As indicated by this equation there is an equilibrium distribution of deuterium between the cyclohexane and hydrogen which, when the exchange reaction is caused to take place in the vapor phase, may be represented as follows:

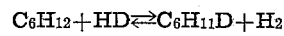

$$K = \frac{C_6H_{11}D \text{ (vapor)}/C_6H_{12} \text{ (vapor)}}{HD \text{ (gas)}/H_2 \text{ (gas)}}$$

and wherein $C_6H_{11}D/C_6H_{12}$ = the molal ratio of the deuterium-containing species to the non-deuterium-containing species of cyclohexane.

$HD/H_2$ = the molal ratio of the deuterium-containing species to the non-deuterium-containing species of hydrogen, and $K$ = a constant at any given temperature.

At small concentrations of deuterium, the constant $K$ may be considered to be the distribution ratio of deuterium between cyclohexane and hydrogen. If, for example, $K$ has a value of 3 this means that the cyclohexane contains about three times as great a concentration of deuterium as does the hydrogen.

The relative concentrations of deuterium in cyclohexane and hydrogen when they are mixed depend upon both the rate of the exchange reaction and the equilibrium distribution, and both reaction rate and equilibrium distribution vary with temperature. It has been found that the reaction rate may be increased by using cyclohexane vapor rather than liquid cyclohexane and also that the rate may be increased by bringing the vapor-gas mixture into contact with a suitable catalyst. However even when the reaction is carried out in the vapor phase and in the presence of a highly active catalyst it proceeds relatively slowly at temperatures of the order of room temperatures and therefore it is usually desirable to employ an elevated reaction temperature.

The relationship between equilibrium distribution and temperature is indicated in the following table:

*Table*

| Temp. in ° C.: | K |
|---|---|
| 110 | 3.0 |
| 157 | 2.5 |
| 184 | 2.3 |
| 310 | 1.44 |
| 350 | 1.30 |

It is apparent that the tendency of deuterium to concentrate in cyclohexane varies inversely as the temperature whereas the reaction rate of the exchange reaction varies directly with the temperature. It has been found that the exchange reaction is preferably carried out at about 100° C. to 200° C.

Various catalysts may be used to catalyze the exchange reaction, the best results having been obtained with active nickel catalysts or with a catalyst comprising an activated cocoanut charcoal having 2½% by weight of finely divided platinum metal deposited thereon. Other catalysts that may be used include heavy metal chromite catalysts. Using the platinum catalyst and volume ratios of hydrogen to cyclohexane vapor of between 6:1 and 1:1, exchange reactions have been carried out at temperatures of 110° C., 157° C. and 184° C. at space velocities of 500 to 100 min.$^{-1}$. (Space velocity is the ratio of the volume flow of gas to the volume of the catalyst.) It was found that at 184° C. and within these ratios of hydrogen to cyclohexane, isotopic equilibrium was established, whereas at lower temperatures equilibrium was approached but not reached at these space velocities.

Hydrogen enriched with respect to deuterium may be recovered from cyclohexane enriched with respect to deuterium by the following well known reaction:

$$C_6H_{12} \rightleftarrows C_6H_6 + 3H_2$$

This reaction proceeds to the right at temperatures of the order of 300° C. to 350° C. to give benzene and hydrogen and proceeds to the left at temperatures of 100° C. to 150° C. to give cyclohexane. Thus the cyclohexane from the exchange reaction may be decomposed to give hydrogen relatively rich in deuterium and the benzene formed may be re-hydrogenated at a lower temperature to form cyclohexane which may be recycled in the process.

Apparatus capable of carrying out a preferred embodiment and an alternative embodiment of the method of the present invention is diagrammatically illustrated in the accompanying drawings. Referring to the drawings and particularly to Fig. 1 which illustrates two stages of a deuterium concentration system the numeral 10 designates a saturator containing a predetermined, substantially constant volume of liquid cyclohexane. Additional cyclohexane is fed continuously to the saturator 10 through a pipe 12 to make up any losses of cyclohexane occurring in the process. From the saturator 10 cyclohexane overflows continuously through pipe 14 to a second saturator 16 and thence to saturators 18, 20 and 22. As the cyclohexane passes from saturator to saturator it is successively enriched with respect to deuterium in the manner hereinafter described.

The cyclohexane from saturator 22 flows to the top of a dehydrogenator tower 26 that is maintained at a temperature of 300° C. to 350° C. to decompose the cyclohexane into benzene and hydrogen, each enriched with respect to deuterium. The enriched hydrogen leaves the dehydrogenator 26 through pipe 27 and flows to the second stage of the dehydrogenating system. The benzene is transferred through pipe 48 to a hydrogenator 46 wherein it is caused to react with hydrogen at a temperature of about 100° C. to 150° C. to form cyclohexane which flows through pipe 50 to the saturator 10. Fresh hydrogen for hydrogenating the benzene is introduced into the hydrogenator 46 through pipe 51.

Fresh hydrogen containing the natural abundance of deuterium is introduced through pipe 28 into the saturator 22 where it is saturated with cyclohexane vapor containing substantially the same proportion of deuterium as the liquid cyclohexane within the saturator. From the saturator 22 the hydrogen and associated cyclohexane vapor pass to a heater 30 where the temperature of the mixture is raised several degrees. It has been found that the adsorption or condensation of liquid cyclohexane on catalyst surfaces substantially reduces the effectiveness of the surfaces in catalyzing the exchange reaction and the purpose of heater 30 is to superheat the vapor-gas mixture slightly in order to make sure that no liquid cyclohexane is formed on the catalyst surfaces.

From the heater 30 the vapor-gas mixture passes to the catalyst chamber 32 wherein an exchange reaction occurs of such a character that deuterium present in the hydrogen gas passes into the cyclohexane vapor and normal hydrogen, i. e. hydrogen of atomic mass 1, is released by the cyclohexane. Upon leaving catalyst chamber 32 the mixture flows to the saturator 20 where a vapor-liquid interchange again takes place between the cyclohexane vapor associated with the hydrogen gas and the liquid cyclohexane within the saturator. As a result of this interchange the liquid cyclohexane in the saturator is enriched with respect to deuterium and the gas leaving the saturator is saturated with cyclohexane vapor having a somewhat lower deuterium content than the cyclohexane vapor in the entering mixture.

From the saturator 20 the gas mixture passes successively through heater 34, catalyst chamber 36, saturator 18, heater 38, catalyst chamber 40, saturator 16, heater 42, catalyst chamber 43, saturator 10, heater 44 and catalyst chamber 45. Hydrogen from the last catalyst unit 45 flows to a cooler 47 where cyclohexane is condensed out and returned to pipe 50 and thence to the saturator 10. The hydrogen from cooler 47 which is relatively depleted with respect to deuterium passes out of the concentrating system through pipe 49.

The apparatus so far described comprises one stage of a multistage system. As indicated in Fig. 1 the number of saturators and catalyst chambers in each stage may be varied. A second stage of the multi-stage system is shown in the lower half of Fig. 1 and is similar to the first stage previously described and operates in a similar manner. Deuterium-enriched hydrogen which leaves the dehydrogenator 26 of the first stage through pipe 27 is divided into two streams. A first portion of the enriched hydrogen flows through pipe 52 to the hydrogenator 54 of the second stage where it reacts with benzene entering through pipe 56 to form cyclohexane which is fed through pipe 58 to the first saturator 60 of the second stage. From the saturator 60 cyclohexane flows successively through the other saturators of the second stage to the final saturator 61 and then through pipe 62 to the dehydrogenator 64. Within the dehydrogenator 64 the cyclohexane is decomposed to form hydrogen which flows through pipe 66 to the third stage of the system and benzene which flows through pipe 56 to the hydrogenator 54.

The second portion of hydrogen from pipe 27 flows through pipe 68 to the saturator 61 and then successively through the saturators, heaters and catalyst chambers of the second stage to the cooler 70. As the hydrogen from pipe 68 flows through the saturators and catalyst chambers of the second stage it gives up deuterium to the cyclohexane which becomes correspondingly enriched in deuterium. In the cooler 70 cyclohexane is condensed out of the hydrogen and flows through pipes 72 and 58 to the saturator 60. Hydrogen depleted with respect to deuterium leaves the cooler 70 and flows through pipe 74 to the first stage of the system and more particularly to pipe 28 and saturator 22. Depleted hydrogen from the third stage of the system enters the second stage through a pipe 76 which is connected to the pipe 58 leading to the final saturator 61 of the second stage.

As in the case of the first stage the number of saturators and catalyst chambers in the second stage may be varied. It may be noted that in each stage cyclohexane and benzene are circulated in a closed cycle and that there are two inflows of hydrogen to and two outflows of hydrogen from each stage. It is apparent that the total deuterium entering each stage must be equal to the total deuterium leaving each stage and that the total hydrogen entering each stage must be equal to the total hydrogen leaving each stage. Therefore, since the hydrogen passing to the next succeeding stage is enriched with respect to deuterium, the volume of the enriched hydrogen will become successively smaller. Consequently it will usually be desirable to reduce the size of the successive stages since these stages will handle successively smaller quantities of reactants.

It is pointed out in my co-pending patent application referred to above that the exchange reaction between water vapor and hydrogen gas containing deuterium proceeds so rapidly that it is not ordinarily necessary or desirable to use pressures above atmospheric pressure. In the case of cyclohexane, however, the exchange reaction at temperatures below the atmospheric pressure boiling point of cyclohexane are relatively low and as previously pointed out it is usually desirable to carry out the exchange reaction in this case at a temperature of 100° C. to 200° C. It is thus apparent that the countercurrent exchange system shown in the drawing should desirably be operated at a pressure greater than atmospheric pressure in order to maintain the cyclohexane in the saturators in a liquid state. Thus, for example, an exchange system such as that shown in Fig. 1 may be operated at a temperature of 150° C. and a total pressure of 27 atmospheres. Since the vapor pressure of cyclohexane at 150° C. is about 5.4 atmospheres the vapor mixture passing through the catalyst bed under these conditions contains hydrogen and cyclohexane in the ratio of approximately 4 to 1. It is apparent that with these operating conditions the exchange reaction is carried out well below the boiling point of cyclohexane at the pressure existing in the system.

The dehydrogenation of cyclohexane to benzene and hydrogen containing deuterium and the hydrogenation of benzene to give cyclohexane are desirably carried out at the indicated temperatures by catalytic processes. These reactions are known in the art and need not be described in detail. It has been found that the dehydrogenation reaction may be carried out advantageously in the presence of a platinum-on-charcoal catalyst at temperatures of the order of 300° C. Other catalysts that may be used include palladium black, nickel on various supports including silica, alumina, and zinc oxide and silico-molybdic acid on active charcoal. Platinum and nickel catalysts are likewise advantageous for the hydrogenation reaction at temperatures of 100–150° C.

Figure 2:
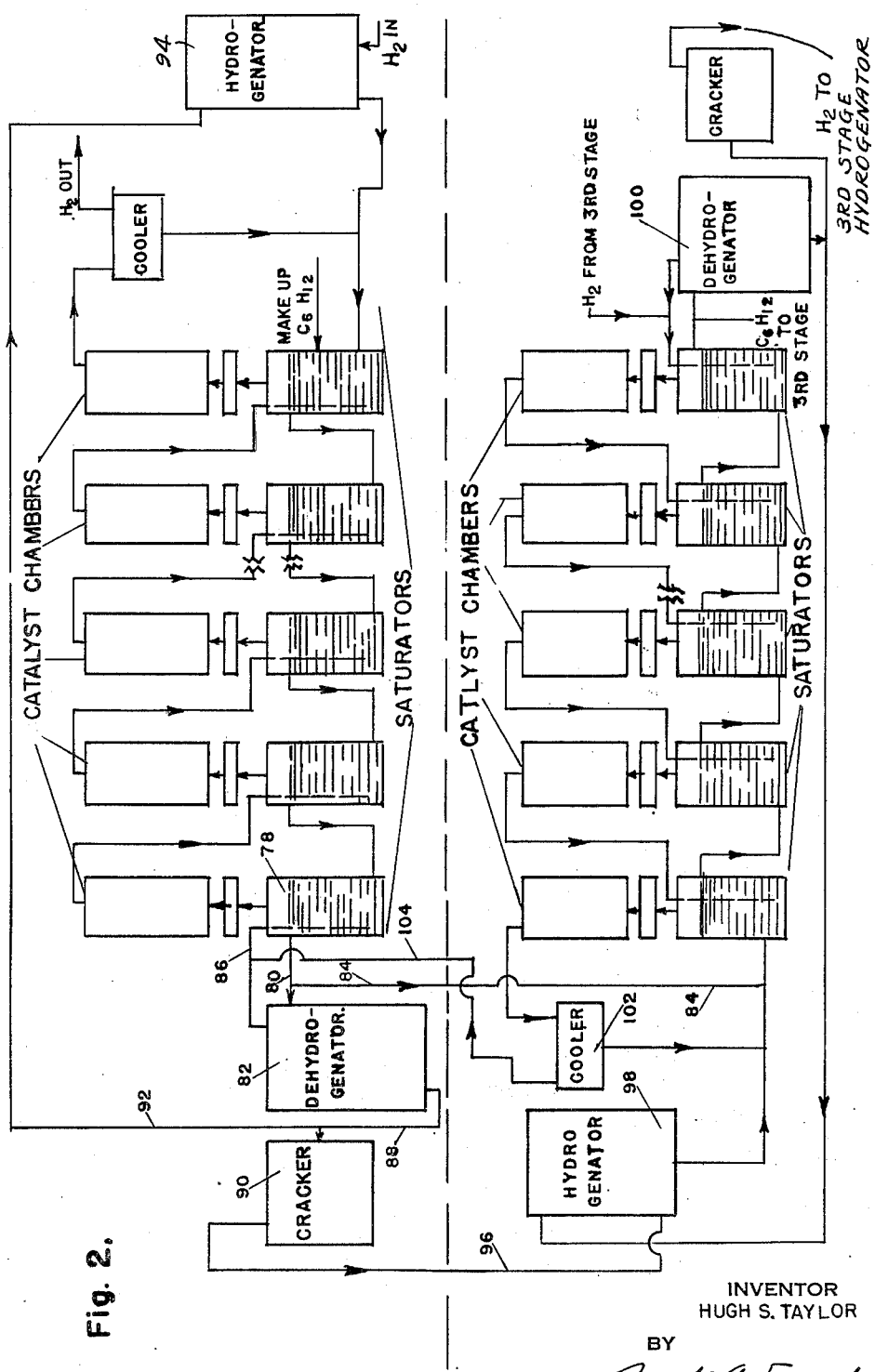

Referring now to Fig. 2 of the drawings this figure illustrates two stages of a multi-stage system generally similar to the system of Fig. 1 but differing therefrom in the respects described below. In the first stage of the concentrating system shown in the upper portion of Fig. 2 cyclohexane leaves the final saturator 78 through a pipe 80 and is divided into two streams, one stream passing to the dehydrogenator 82 and a second stream flowing through a pipe 84 to the second stage of the system. In dehydrogenator 82 the portion of the cyclohexane entering the dehydrogenator is decomposed to give deuterium-enriched hydrogen which is returned through pipe 86 to the saturator 78 and deuterium-enriched benzene which leaves the dehydrogenator 82 through pipe 88. The benzene flowing through pipe 88 is divided into two streams, one stream flowing through a pipe 92 to a hydrogenator 94 where it is hydrogenated as in the system of Fig. 1 to form cyclohexane to be fed to the exchange system and the other stream flowing into the cracker 90.

Within the cracker 90 the deuterium-enriched benzene is decomposed to form enriched hydrogen which flows through pipe 96 to the hydrogenator 98 of the second stage of the concentrating system, wherein it reacts with benzene from the second stage dehydrogenator 100 to form cyclohexane used as feed to the second stage saturators. Hydrogen from the second stage dehydrogenator 100 flows through the saturators and catalyst chambers of the second stage as indicated, then through cooler 102 and pipe 104 to the pipe 86, and thence to the final saturator 78 of the first stage of the system.

It is apparent that the system of Fig. 2 differs from the system of Fig. 1 in the following principal respects: (1) the enriched hydrogen fed to successive stages is obtained by cracking benzene, (2) enriched hydrogen from the dehydrogenator of each stage is used as feed to the saturators of that stage, (3) a portion of the enriched cyclohexane formed in each stage flows to the next succeeding stage. An advantage of the system of Fig. 1 is that the only losses of cyclohexane and benzene that occur are those incidental to the dehydrogenation of cyclohexane and the hydrogenation of benzene. Thus the consumption of these relatively expensive materials is relatively small as compared with their consumption in a system such as that of Fig. 2. On the other hand the system of Fig. 2 gives a somewhat larger separation per stage than the system of Fig. 1. For example the system of Fig. 1 may yield a 1.4-fold increase in concentration per stage whereas the system of Fig. 2 may yield a 2.5-fold increase under similar conditions of operation.

It is to be understood that the foregoing description is illustrative only and that numerous changes might be made without departing from the spirit of the invention. It is unnecessary, for example, that the exchange reaction be carried completely to equilibrium in the catalyst chambers nor is it necessary that vapor-liquid equilibrium be completely established in the saturators. The extent to which it is desirable to approach equilibrium in particular cases will depend upon economic considerations.

It is not necessary that the number of catalyst chambers and saturators be equal. In some cases, for example, it may be desirable to use two or three saturators for each catalyst chamber in order to make sure that the gas coming into contact with the catalyst mass is saturated with cyclohexane vapor having the same isotopic composition as the liquid cyclohexane in the saturator. In the system of Fig. 1, hydrogen may be circulated in a closed cycle and cyclohexane advanced from stage to stage.

As pointed out above the number of exchange units in each stage and the number of stages may be varied. The number of single exchange units in each stage, i. e. the number of pairs of saturators and catalyst chambers depends essentially upon the flow rates used and their relationship to the degree of equilibrium desired in each stage. If high flow rates are used, equilibrium conditions may not be attained in the individual exchange units and therefore a greater number of exchange units will be required to obtain a given enrichment of cyclohexane and depletion of the hydrogen gas.

The criteria for determining how many single exchange units should be used per stage, how many stages should be used, and what flows should be used in particular cases are in general analogous to the criteria for determining similar factors in the art of fractional distillation. Specific values may be arrived at by using obvious modifications of calculative techniques that are well known to those skilled in the art. For example the number of exchange units to be used in a given gas may be determined by methods analogous to those employed in determining the number of plates to be used in a fractionating tower, namely by computing the theoretical units required to achieve a given concentration of the deuterium concentration species, assuming attainment of complete equilibrium, and then increasing the theoretical number of units by a factor based on an estimate of the percent of equilibrium that will probably be attained under the particular conditions of operation selected. Equilibrium conditions for the catalyst chamber are indicated in the specific example and equilibrium conditions for saturator operation may be determined from existing published data on vapor-liquid equilibria.

From the above description it is apparent that the present method provides an unusually effective way of concentrating deuterium. By causing the exchange reaction to proceed in the vapor phase a relatively high reaction rate is obtainable and by operating under conditions such that cyclohexane may exist as a liquid, it is possible to pass the vapor-gas mixture leaving the catalyst mass directly into the liquid cyclohexane to equalize the deuterium concentrations in the cyclohexane vapor and liquid cyclohexane. If on the other hand the exchange reactions were carried out above the boiling point of cyclohexane, the additional step of cooling the gaseous mixture and/or condensing the enriched cyclohexane vapor would be necessary. The term "boiling point" as used in the present specification and claims is not limited to the atmospheric pressure boiling point.

Since many embodiments might be made of the above-described invention and since many changes might be made in the embodiment described, it is to be understood that the foregoing description is to be interpreted as illustrative only and not in a limiting sense.

I claim:

1. A process for increasing the concentration of deuterium comprising the steps of forming a mixture of cyclohexane and hydrogen containing deuterium, causing an exchange of hydrogen isotopes to take place between said cyclohexane and said hydrogen to form cyclohexane enriched in deuterium, and dehydrogenating at least a part of said enriched cyclohexane to obtain hydrogen enriched in deuterium.

2. A process for increasing the concentration of deuterium comprising the steps of forming a mixture of cyclohexane and hydrogen containing deuterium, causing an exchange of hydrogen isotopes to take place between said cyclohexane and said hydrogen to form cyclohexane enriched in deuterium, and thermolytically decomposing at least a part of said enriched cyclohexane to obtain hydrogen enriched in deuterium.

3. A method for increasing the concentration of deuterium comprising the steps of forming a mixture of cyclohexane vapor and hydrogen containing deuterium in a concentration greater than that which it would contain if it were in equilibrium with said cyclohexane vapor, causing an exchange of hydrogen isotopes to take place in the vapor phase to produce cyclohexane enriched with respect to deuterium, separating said enriched cyclohexane from said hydrogen, and dehydrogenating at least a part of said enriched cyclohexane to form hydrogen enriched with respect to deuterium.

4. A process for increasing the concentration of deuterium comprising the steps of forming a mixture of cyclohexane vapor and hydrogen containing deuterium, causing an exchange of hydrogen isotopes to take place between said hydrogen and said cyclohexane vapor at a temperature below the boiling point of cyclohexane to form cyclohexane enriched with respect to deuterium, separating said enriched cyclohexane from said hydrogen, and dehydrogenating at least a part of said cyclohexane to obtain hydrogen enriched in deuterium.

5. A process for increasing the concentration of deuterium comprising the steps of forming a mixture of cyclohexane and hydrogen containing deuterium, causing an exchange of hydrogen isotopes to take place between said hydrogen and said cyclohexane at a temperature of 100° C. to 200° C. to form cyclohexane enriched with respect to deuterium.

6. A process for increasing the concentration of deuterium comprising the steps of forming a mixture of cyclohexane and hydrogen containing deuterium, causing an exchange of hydrogen isotopes to take place between said hydrogen and said cyclohexane at a temperature of 100° C. to 200° C. to form cyclohexane enriched in deuterium, and dehydrogenating at least a part of said enriched cyclohexane at a temperature of 300° C. to 350° C. to obtain hydrogen enriched in deuterium.

7. A process for increasing the concentration of deuterium comprising the steps of forming a mixture of cyclohexane and hydrogen containing deuterium, causing an exchange of hydrogen isotopes to take place between said cyclohexane and said hydrogen to produce cyclohexane enriched with respect to deuterium, dehydrogenating at least a portion of said enriched cyclohexane to form hydrogen enriched with respect to deuterium and benzene, and causing said benzene to react with hydrogen to form cyclohexane for re-use in said process.

8. A process for increasing the concentration of deuterium comprising the steps of forming a mixture of cyclohexane vapor and hydrogen containing deuterium, causing an exchange of hydrogen isotopes to take place between said hydrogen and said cyclohexane vapor at a temperature below the boiling point of cyclohexane to produce cyclohexane enriched with respect to deuterium, separating said cyclohexane and said hydrogen, dehydrogenating at least a portion of said cyclohexane to form deuterium-enriched hydrogen and benzene, and causing said benzene to react with hydrogen to form cyclohexane for re-use in said process.

9. A process for increasing the concentration of deuterium which comprises establishing a countercurrent flow of cyclohexane and hydrogen containing deuterium in a series of stages, mixing said cyclohexane and hydrogen intimately in each of said stages to cause an exchange of hydrogen isotopes to take place between said cyclohexane and said hydrogen to produce deuterium-enriched cyclohexane, decomposing at least a part of the enriched cyclohexane from each of said stages to recover deuterium-enriched hydrogen therefrom, and feeding said recovered hydrogen to the next succeeding stage of said series.

10. A process for increasing the concentration of deuterium comprising the steps of establishing a countercurrent flow of cyclohexane and hydrogen containing deuterium in a series of stages, mixing said hydrogen and cyclohexane intimately in each of said stages to cause a hydrogen isotope exchange to take place to produce cyclohexane enriched with respect to deuterium, decomposing at least a part of the enriched cyclohexane from each of said stages to produce deuterium-enriched hydrogen and benzene therefrom, feeding said enriched hydrogen to the next succeeding stage of said series, and causing said benzene to react with hydrogen to form cyclohexane for re-use in the same stage of said series.

11. A process for increasing the concentration of deuterium comprising the steps of establishing a countercurrent flow of cyclohexane and hydrogen containing deuterium in a series of stages, mixing said cyclohexane and hydrogen intimately in each stage of said series to cause a hydrogen isotope exchange to take place to produce deuterium-enriched cyclohexane and deuterium-depleted hydrogen, decomposing at least a part of the enriched cyclohexane from each of said stages to produce deuterium-enriched hydrogen, feeding said enriched hydrogen to the next succeeding stage of said series, and feeding said depleted hydrogen to the next preceding stage of said series.

12. A process for increasing the concentration of deuterium comprising the steps of establishing a countercurrent flow of cyclohexane and hydrogen containing deuterium in a series of stages, mixing said cyclohexane and hydrogen intimately in each of said stages to cause a hydrogen isotope exchange to take place to produce deuterium-enriched cyclohexane and deuterium-depleted hydrogen, dehydrogenating at least a part of the enriched cyclohexane from each stage to produce deuterium-enriched hydrogen and benzene, using said enriched hydrogen for exchange with cyclohexane in the same stage in which said cyclohexane is enriched, decomposing said benzene to form hydrogen containing deuterium, and feeding said last named hydrogen to the next succeeding stage of said series.

13. A process for increasing the concentration of deuterium which comprises establishing a countercurrent flow of cyclohexane and hydrogen containing deuterium in a series of stages, mixing said cyclohexane and hydrogen intimately in each stage to cause an exchange of hydrogen isotopes to take place to produce deuterium-enriched cyclohexane and deuterium-depleted hydrogen, dehydrogenating the enriched cyclohexane in each of said stages to produce deuterium-enriched hydrogen, feeding a portion of the enriched hydrogen from each of said stages to the next succeeding stage for countercurrent flow with cyclohexane, and feeding the remainder of said enriched hydrogen from each of said stages to the next succeeding stage for reaction with benzene to produce cyclohexane.

14. A process for increasing the concentration of deuterium which comprises establishing a countercurrent flow of cyclohexane and hydrogen containing deuterium in a series of stages, mixing said cyclohexane and hydrogen intimately in each stage to cause an exchange of hydrogen isotopes to take place to produce deuterium-enriched cyclohexane and deuterium depleted hydrogen, dehydrogenating the enriched cyclohexane in each of said stages to produce deuterium-enriched hydrogen, feeding a portion of the enriched hydrogen from each of said stages to the next succeeding stage for countercurrent flow with cyclohexane, feeding the remainder of said enriched hydrogen from each of said stages to the next succeeding stage for reaction with benzene to produce cyclohexane, and returning the depleted hydrogen from each of said stages to the next preceding stage for admixture with cyclohexane in said preceding stage.

15. A method of increasing the concentration of the deuterium-containing species in cyclohexane by an isotopic exchange between cyclohexane and hydrogen gas containing deuterium which comprises passing said hydrogen countercurrently through successive bodies of liquid cyclohexane having successively decreasing concentrations of deuterium, causing said hydrogen to mix intimately with said bodies of cyclohexane, whereby the gas leaving each of said bodies is associated with cyclohexane vapor having a deuterium concentration approximately the same as that of the body of the cyclohexane which it is leaving, and intermittently passing said hydrogen and associated cyclohexane vapor over catalyst masses to produce an exchange, whereby said hydrogen is successively depleted with respect to deuterium and enriches with respect to deuterium the successive bodies of cyclohexane with which it comes in contact.

16. A method of increasing the concentration of the deuterium containing species in cyclohexane by an isotopic exchange between cyclohexane and hydrogen gas containing deuterium which comprises passing said hydrogen countercurrently through successive bodies of liquid cyclohexane having successively decreasing concentrations of deuterium, causing said hydrogen to mix intimately with said bodies of said cyclohexane, whereby the gas leaving each of said bodies is associated with cyclohexane vapor having a deuterium concentration approximately the same as that of the body of cyclohexane which it is leaving, and intermittently passing said hydrogen and associated cyclohexane vapor at a temperature between 100° C. and 200° C. over catalyst masses to produce an isotopic exchange whereby said hydrogen is successively depleted with respect to deuterium and enriches with respect to deuterium the successive bodies of liquid cyclohexane with which it comes in contact.

17. A method of increasing the concentration of the deuterium containing species of cyclohexane by an isotopic exchange of cyclohexane and hydrogen gas containing deuterium which comprises causing liquid cyclohexane to flow successively through a series of saturators containing bodies of cyclohexane, thermolytically decomposing a portion of the cyclohexane leaving the last saturator of said series to produce hydrogen which is relatively rich in deuterium, passing said hydrogen countercurrently and successively through the bodies of cyclohexane in said saturators, causing said hydrogen to mix intimately with said bodies of cyclohexane, whereby the gas leaving each of said saturators is associated with cyclohexane vapor having a deuterium concentration approximately the same as that of the body of cyclohexane which it is leaving, intermittently passing said hydrogen and associated cyclohexane vapor over a catalyst to produce an isotopic exchange, whereby said hydrogen is successively depleted with respect to deuterium and enriches with respect to deuterium the successive bodies of cyclohexane with which it comes in contact, and removing as product the undecomposed portion of cyclohexane leaving said last saturator.

18. A method of increasing the concentration of the deuterium containing species in cyclohexane by an isotopic exchange between cyclohexane and hydrogen gas containing deuterium which comprises causing liquid cyclohexane to flow successively through a series of saturators containing bodies of liquid cyclohexane, thermolytically decomposing a portion of the cyclohexane leaving the last saturator of said series to produce hydrogen which is relatively rich in deuterium, passing said hydrogen countercurrently and successively through the bodies of cyclohexane in said saturators, causing said hydrogen to mix intimately with said bodies of cyclohexane at a temperature between 100° C. and 200° C., whereby the gas leaving each of said saturators is associated with cyclohexane vapor having a deuterium concentration approximately the same as that of the body of cyclohexane which it is leaving, intermittently passing said hydrogen and associated cyclohexane vapor at a temperature between 100° C. and 200° C. over a catalyst to produce an isotopic exchange whereby said hydrogen is successively depleted with respect to deuterium and enriches with respect to deuterium the successive bodies of cyclohexane with which it comes in contact, and removing as product the undecomposed portion of cyclohexane leaving said last saturator.

19. In a method of increasing the concentration of the deuterium-containing species in cyclohexane by a catalytic, isotopic exchange between cyclohexane and a gas containing deuterium at a concentration in excess of that which it would contain when the cyclohexane-gas system is in isotopic equilibrium, the steps of forming a mixture of said gas and cyclohexane vapor, heating said mixture to an extent sufficient to prevent condensation of said vapor during said catalytic exchange, passing said mixture over a catalyst at a temperature of 100° C. to 200° C. to cause an isotopic exchange to take place between said cyclohexane vapor and said gas, condensing said cyclohexane vapor, and separating said condensate from said gas.

20. A method of increasing the concentration of the deuterium-containing species in cyclohexane by an isotopic exchange between cyclohexane and hydrogen gas containing deuterium which comprises passing said hydrogen countercurrently through successive bodies of liquid cyclohexane having successively decreasing concentrations of deuterium, causing said hydrogen to mix intimately with said bodies of cyclohexane whereby the gas leaving each of said bodies is associated with cyclohexane vapor having a deuterium concentration approximately the same as that of the body of cyclohexane which it is leaving, intermittently passing said cyclohexane vapor and gas over catalyst masses to produce an isotopic exchange whereby said hydrogen is successively depleted with respect to deuterium and enriches with respect to deuterium the successive bodies of cyclohexane with which it comes in contact, and heating the gas-vapor mixture before it passes over each catalyst mass to an extent sufficient to prevent condensation of said vapor on the surface of said catalyst.

21. A method of concentrating deuterium in cyclohexane or in a gas containing hydrogen by exchange of the isotopic species of hydrogen between cyclohexane and said gas, comprising the steps of forming a mixture of said gas and cyclohexane vapor, causing an isotopic exchange to take place in the vapor phase between said cyclohexane vapor and said gas, condensing said cyclohexane vapor to a liquid, and separating the gas and condensate.

22. In a method of increasing the concentration of the deuterium-containing species in cyclohexane by exchange of isotopic species between cyclohexane and hydrogen containing deuterium at a concentration in excess of that which it would contain when the cyclohexane-hydrogen system is in isotopic equilibrium, the steps of forming a mixture of hydrogen and cyclohexane vapor, and passing the resulting mixture over a catalyst at a temperature below the boiling point of cyclohexane to cause an exchange of the isotopic species of hydrogen to take place between said cyclohexane vapor and said hydrogen.

References Cited in the file of this patent

Sattler: The Solubility of Hydrogen in Liquid Hydrocarbons, Chemical Abstracts, vol. 36, page 18 (1942).